United States Patent
Kanemitsu et al.

(10) Patent No.: US 7,012,111 B2
(45) Date of Patent: Mar. 14, 2006

(54) HIGH-SPECIFIC-GRAVITY EPDM COMPOSITION, DYNAMIC DAMPER MADE FROM THE COMPOSITION, TENNIS RACKET WITH THE DYNAMIC DAMPER, AND RADIATION-SHIELDING MATERIAL COMPRISING THE COMPOSITION

(75) Inventors: Yumi Kanemitsu, Hyogo (JP); Toshiaki Sakaki, Hyogo (JP); Tetsuo Mizoguchi, Hyogo (JP); Toshihiko Takiguchi, Osaka (JP); Hitoshi Takii, Osaka (JP); Toshinori Sakamaki, Hyogo (JP); Noboru Uenishi, Hyogo (JP); Shinji Kikuhara, Hyogo (JP)

(73) Assignees: Sumitomo Rubber Industries, Ltd., Hyogo (JP); Sumitomo Electric Industries, Ltd., Osaka (JP)

( * ) Notice: Subject to any disclaimer, the term of this patent is extended or adjusted under 35 U.S.C. 154(b) by 208 days.

(21) Appl. No.: 10/250,305

(22) PCT Filed: Jun. 17, 2002

(86) PCT No.: PCT/JP02/06044
§ 371 (c)(1),
(2), (4) Date: Jun. 30, 2003

(87) PCT Pub. No.: WO03/002656
PCT Pub. Date: Jan. 9, 2003

(65) Prior Publication Data
US 2004/0048698 A1 Mar. 11, 2004

(30) Foreign Application Priority Data
Jun. 28, 2001 (JP) .......................................... 2001-196428
May 20, 2002 (JP) .......................................... 2002-144442

(51) Int. Cl.
C08K 3/08 (2006.01)
C08K 3/10 (2006.01)
C08K 3/22 (2006.01)
A63B 49/02 (2006.01)

(52) U.S. Cl. ................ 524/406; 473/520; 473/524; 523/136; 523/137; 524/439

(58) Field of Classification Search ................ 473/520, 473/524; 523/136–137; 524/406, 439
See application file for complete search history.

(56) References Cited

U.S. PATENT DOCUMENTS

| | | | |
|---|---|---|---|
| 5,728,008 A | 3/1998 | Howard | |
| 5,908,884 A | 6/1999 | Kawamura et al. | |
| 2002/0058557 A1 | 5/2002 | Kanemitsu | |
| 2003/0022733 A1 * | 1/2003 | Sullivan et al. | 473/372 |

FOREIGN PATENT DOCUMENTS

| JP | 8-113683 A | 5/1996 |
|---|---|---|
| JP | 8-122492 A | 5/1996 |
| JP | 10-153687 A | 6/1998 |
| JP | 10-168255 A | 6/1998 |
| JP | 10-263115 A | 10/1998 |
| JP | 2000-027331 A | 1/2000 |
| JP | 2002-048185 A | 2/2002 |
| JP | 2002-85598 A | 3/2002 |

* cited by examiner

*Primary Examiner*—Peter Szekely
(74) *Attorney, Agent, or Firm*—Birch, Stewart Kolasch & Birch, LLP

(57) ABSTRACT

A high specific-gravity EPDM composition consisting of a mixture of EPDM containing diene at less than 4.5 wt % and ethylene at not less than 58 wt % nor more than 80 wt % and having a Mooney viscosity $ML_{1+4}$ not less than 50 nor more than 170 at 125° C. and a powdery material, containing powder whose specific gravity is not less than 12 as a main component thereof, added to the EPDM at not less than 80 wt % nor more than 97.5 wt % of a whole amount of the high specific-gravity EPDM composition.

10 Claims, 10 Drawing Sheets string (impact by back side)

1

73

(out-of-plane the 2nd frequency)

US 7,012,111 B2

HIGH-SPECIFIC-GRAVITY EPDM COMPOSITION, DYNAMIC DAMPER MADE FROM THE COMPOSITION, TENNIS RACKET WITH THE DYNAMIC DAMPER, AND RADIATION-SHIELDING MATERIAL COMPRISING THE COMPOSITION

This application is the national phase under 35 U.S.C. §371 of PCT International Application No. PCT/JP02/06044 which has an International filing date of Jun. 17, 2002, which designated the United States of America.

BACKGROUND OF THE INVENTION

1. Field of the Invention

The present invention relates to a high specific-gravity EPDM composition, a dynamic damper composed of the high specific-gravity EPDM composition, a dynamic damper-installed tennis racket, and radioactive ray shielding material composed of the high specific-gravity EPDM composition. More particularly, the high specific-gravity EPDM composition of present invention has improved moldability and weatherability to be used as the dynamic damper that is mounted on sports goods and the like and as the radioactive ray shielding material of radiographic inspection appliances and the like.

2. Description of the Related Art

The dynamic damper (vibration-damping material) is often used to reduce and relieve impacts and vibrations generated in sporting ball-hitting goods and the like when they are used. For example, in the tennis racket, the dynamic damper is fixed to the racket frame thereof to resonate the dynamic damper with vibrations of the racket frame when the tennis racket hits a tennis ball. Thereby the vibrations generated by an impact are relieved to reduce vibrations to be transmitted to a player's hand. In this manner, occurrence of tennis elbow is suppressed.

For example, the present applicant proposed a dynamic damper to be installed on the tennis racket as disclosed in Japanese Patent Application Laid-Open No. 2002-085598 and No. 2002-048185. In the proposal, as the material for the mass-adding part of the dynamic damper, the present applicant proposed a thermoplastic elastomer and chloroprene rubber in which lead and tungsten are dispersed. However, the lead which has been hitherto used in a large amount is inexpensive but the use mode thereof and the use amount thereof are restricted to prevent environmental pollution.

There is a fear that a tennis player touches the dynamic damper or strikes the dynamic damper against others by mistake. In the case where the dynamic damper is formed of a hard material such as metal, there is a possibility that the tennis player is injured, which is not preferable. Ordinary metals have a comparatively low specific gravity. Thus when they are used as the mass-adding part of the dynamic damper, the dynamic damper has a large volume, which disturbs the player during the use of the tennis racket. For appearance, it is preferable that the dynamic damper is small.

Therefore the tennis player desires a material not polluting environment, soft, having a high specific gravity, and having a comparatively high strength so that it is not broken when it drops or strikes against an object. For example, if the mass-adding part of the dynamic damper is sheet-shaped and its thickness is as thin as 0.6 mm to reduce its volume, it is necessary for the material having a high specific gravity to be soft in such an extent that the material flows smoothly in a molding die and have a strength in such an extent that it is not broken, even though it is thin and sheet-shaped. Because the dynamic damper is formed by combining the mass-adding part and the viscoelastic part with each other, it is necessary that the material has adhesion to other materials.

For applications other than the dynamic damper, there is a demand for the development of a material which has a high specific gravity (4–13) and is soft. Thus in recent years, a large number of rubbers and resinous materials having a high specific gravity are proposed.

For example, in Japanese Patent Application Laid-Open No.2000-27331, there is proposed a vibration-damping/sound insulation sheet to which slurry containing a large amount of a high specific gravity filler and an emulsion of rubber is applied In the field of shielding radioactive rays, in addition to a radioactive ray-shielding protection cloths used for medical purposes, only a predetermined portion is irradiated with a necessary amount of the radioactive rays in radiation therapy and measurement and portion which is not necessary is not irradiated. This is because there is a demand for prevention of destruction of normal cells and prevention of excessive exposure to radiation. As such, a radioactive ray shielding material is used in portions other than the portion to be irradiated with the radioactive rays. In fields other than the medical field, the radioactive ray shielding material is also used to shield the radioactive ray in inspections of food, inspections at a custom house, and techniques of analyzing objects without destroying them.

Heretofore, a material in which lead, a lead compound, a lead alloy or antimony is blended in resin or rubber is generally used for the radioactive ray shielding protection cloths. An acrylic plate or the like has been used for comparatively weak radioactive rays. A tungsten and a plate made of an alloy thereof are also used as the radioactive ray shielding material.

As disclosed in Japanese Patent Application Laid-Open No.8-122492, there is proposed a radioactive ray shielding material made of a resin containing a plasticizer in which tungsten is dispersed.

As disclosed in Japanese Patent Application Laid-Open No.10-153687, there are proposed vulcanized fluororubber and EPDM rubber both containing tungsten dispersed therein and also chloroprene rubber containing tungsten dispersed therein.

However, the method of applying the emulsion to the vibration-damping/sound insulation sheet disclosed in Japanese Patent Application Laid-Open No.2000-27331 is capable of forming a coating film, but is incapable of forming molded products thick or complicated in configuration.

In the radioactive ray shielding material disclosed in Japanese Patent Application Laid-Open No.8-122492, tungsten may settle in the process of drying and removing a solvent. Thus there is a room for improvement in heat resistance and strength of the radioactive ray shielding material.

As described above, as the material for the radioactive ray shielding material, the vibration-damping/sound insulation sheet, the soundproof material, and the like, there is a demand for development of a material which is soft and has a high specific gravity. However, the proposed materials are all hard and difficult to handle and moreover there is a room for improvement in unpollutability, moldability, and processability.

In the radioactive ray shielding field, in the case where lead or its alloy is used, it is necessary to prepare a casting mold to process the lead or its alloy into a predetermined configuration and dissolve the lead or its alloy in the casting mold to cast it. A lead-casting work is very costly because it is necessary to dissolve the lead or its alloy and manufacture the casting mold. Further the dissolving the lead or its alloy causes environment around a work place to deteriorate and affect a human body adversely.

In the case where the radioactive ray shielding material is used for inspection of food or the like, when the radioactive ray shielding material is used in contact with a human body directly or indirectly, there is a fear that the lead which has separated from the radioactive ray shielding material contaminates environment. The melting point of the lead alloy is as low as 80° C. Thus in the case where the radioactive ray shielding material having the lead alloy is used for a medical purpose, a medical appliance or the like having the radioactive ray shielding material cannot be heated at about 100° C. although it is necessary to sterilize it in hot water. Further the radioactive ray shielding material having the lead alloy cannot be used for a pipe or the like of an atomic power plant or the like, because the pipe is required to have heat resistance at 200° C. As described above, in the radioactive ray shielding field, there is a demand for the development of a material which is high in specific gravity, the performance of shielding radioactive rays, strength, moldability, and workability.

Chloroprene in which tungsten is dispersed is a little bad in weatherability. Thus in an outdoor exposure test (sunshine) which is conducted in a strict condition and in a sunshine weatherometer test of exposing an object to ultraviolet rays, tungsten and additives are liable to bloom or whiten.

The vulcanized fluororubber disclosed in Japanese Patent Application Laid-Open No.10-153687 is elastic, soft, strong to some extent, and superior in weatherability, but has a room for improvement in adhesion performance and in a process of combining other materials and the fluororubber with each other. The EPDM rubber also disclosed in Japanese Patent Application Laid-Open No. 10-153687 has rubber elasticity and a high strength, is superior in weatherability, and more adhesive than the fluororubber. Thus the EPDM rubber can be processed in combination with an adhesive agent or other materials, but has a room for improvement in moldability, processability, and weatherability in the case where metal powder having a high specific gravity is dispersed in the EPDM rubber.

SUMMARY OF THE INVENTION

The present invention has been made in view of the above-described problems. Thus it is a first object of the present invention to provide a high specific-gravity EPDM composition which is soft and high in specific gravity, moldability, processability, weatherability, and strength.

It is a second object of the present invention to provide a dynamic damper that has a small volume, is high in vibration-damping performance, and is preferably attached to sports goods.

It is a third object of the present invention to provide a tennis racket on which a dynamic damper small and thin, not disturbing a player in playing tennis, and superior in operability is installed.

It is a fourth object of the present invention to provide a radioactive ray shielding material which does not pollute environment and is high in moldability and processability, strength, and radioactive ray shielding performance.

To achieve the first object, the present invention provides a high specific-gravity EPDM composition consisting of a mixture of EPDM containing diene at less than 4.5 wt % and ethylene at not less than 58 wt % nor more than 80 wt % and having a Mooney viscosity $ML_{1+4}$ not less 50 nor more than 170 at 125° C. and a powdery material, containing powder whose specific gravity is not less than 12 as a main component thereof, added to the EPDM at not less than 80 wt % nor more than 97.5 wt % of a whole amount of the high specific-gravity EPDM composition.

The molecular weight, the amount of the diene, and the amount of the ethylene differentiate the characteristic of the EPDM. The invention is based on the present inventors' finding, made as result of experiments, that it is possible to obtain the high specific-gravity EPDM composition that is soft and high in specific gravity, moldability, processability, and weatherability, and strength by using the EPDM which is specified to the above-described range in its diene amount, ethylene amount, and Mooney viscosity and by adding the powdery material containing powder whose specific gravity is not less than 12 as its main component to the EPDM at a wt % in the above-described range.

The amount of the diene is less than 4.5 wt % (wt % of diene component of entire material of EPDM) and preferably less than 3.5 wt %.

In an outdoor exposure test (sunshine) and a sunshine weatherometer test of exposing the high specific-gravity EPDM composition to ultraviolet rays, the powdery material such as tungsten and the like and an additive contained in the EPDM blooms in the case where the EPDM containing much diene is used. However, by reducing the diene amount of the EPDM to less than 4.5 wt %, it is possible to suppress generation of the blooming and improve the weatherability of the high specific-gravity EPDM composition.

To form the high specific-gravity EPDM rubber at a required strength, it is important to optimize the range of the amount of the ethylene and the range of the Mooney viscosity. It is preferable to use the EPDM containing a large amount of the ethylene and having a high Mooney viscosity.

Therefore the weight percentage of the ethylene of the entire material of the EPDM is set to not less than 58 wt % nor more than 80 wt % and favorably not less than 64 wt % nor more than 80 wt % and more favorably not less than 64 wt % nor more than 70 wt %. Most favorable range of the weight percentage of the ethylene is not less than 64 wt % nor more than 66 wt %.

If the EPDM contains less than 58 wt % of the ethylene, the EPDM has a low strength. Thus in molding the high specific-gravity EPDM composition into a sheet after the powdery material is dispersed in the EPDM, the moldability of the high specific-gravity EPDM composition is low. On the other hand, if the EPDM contains more than 80 wt % of the ethylene, the EPDM is hard. Therefore it is difficult to disperse the powdery material such as tungsten and the like uniformly in the EPDM. In this case, in molding the high specific-gravity EPDM composition into a thin sheet, its moldability is liable to deteriorate and a product such as a dynamic damper formed by molding the high specific-gravity EPDM composition is hard. Thus the product strikes against a human body strongly.

The Mooney viscosity $ML_{1+4}$ of the EPDM at 125° C. is set to not less than 50 nor more than 170 and favorably to not less than 100 nor more than 170 and more favorably to not less than 150 nor more than 165.

The Mooney viscosity is measured by the method provided by JIS K6300 and used as an index indicating a viscosity. M of $ML_{1+4}$ is the first letter of Mooney and L of $ML_{1+4}$ is the first letter of L-type rotor. (1+4) of $ML_{1+4}$ means a preheating time period of one minute and a rotation time period (four minutes) of a rotor.

If the Mooney viscosity is less than 50 at 125° C., the EPDM has a low strength. Thus the mixture of the EPDM and the powdery material such as the tungsten and the like dispersed therein has a low moldability.

On the other hand, the EPDM having the Mooney viscosity more than 170 at 125° C. is hard. Thus it is difficult to accomplish uniform dispersion of the powdery material in the EPDM. Consequently the high specific-gravity EPDM composition has a low moldability in molding it into a thin sheet. Thus the product formed by molding the high specific-gravity EPDM composition is hard and strikes against a human body strongly.

The molecular weight of the EPDM can be determined to some extent, based on the Mooney viscosity. The more the Mooney viscosity, the more the molecular weight of the EPDM. When the Mooney viscosity is 50, the molecular weight of the EPDM is 300,000–400,000. When the Mooney viscosity is 170, the molecular weight of the EPDM is about 600,000.

The EPDM is mixed with the powdery material, containing the powder having the specific gravity not less than 12 as its main component, at not less than 85 wt % of the weight of the entire high specific-gravity EPDM composition (total weight of EPDM, additives, and powdery material) nor more than 97.5 wt %.

If the mixing amount of the powdery material containing the powder having the specific gravity not less than 12 as its main component is less than 85 wt % of the entire weight of the high specific-gravity EPDM composition, the specific gravity of the entire high specific-gravity EPDM composition is not so high. In this case, in adding a necessary mass to the mass-adding part of the dynamic damper, it is necessary to make the mass-adding part large. Consequently the volume of the dynamic damper becomes large.

On the other hand, if the mixing amount of the powdery material containing the powder having the specific gravity not less than 12 is more than 97.5 wt % of the entire weight of the high specific-gravity EPDM composition, the EPDM is incapable of covering the surface of the powdery material. Consequently the strength of the high specific-gravity EPDM composition and its moldability are low.

In the case where the high specific-gravity EPDM composition contains the powdery material containing the powder having a specific gravity not less than 12 as its main component, it is possible to increase the specific gravity of the high specific-gravity EPDM composition efficiently. Thus it is possible to reduce the volume of a product formed by molding the high specific-gravity EPDM composition. From the above viewpoint, the powder having the specific gravity not less than 12 is contained in the powdery material at not less than 70 wt % and preferably at not less than 80 wt % of the weight of the entire powdery material.

To disperse the powdery material in the EPDM favorably to increase the strength of the high specific-gravity EPDM composition, the average particle diameter of the powder is favorably less than 50μm and more favorably less than 20μm. The flowability and moldability of the high specific-gravity EPDM composition can be increased by using powder having a small diameter, for example, less than 5 μm in combination with powder having a large diameter, for example, more than 27μm.

Tungsten, a tungsten compound or a tungsten based alloy is preferable as the powdery material containing the powder having the specific gravity not less than 12.

Of metal materials, tungsten has a high specific gravity, is unharmful to a human body, inexpensive, and easily obtainable. Thus the tungsten can be preferably used. Since the tungsten has a high specific gravity, it is preferable that the powdery material consists of the tungsten(100%). However it is possible to use the tungsten compound or the tungsten based alloy. Alternatively a mixture of the tungsten, the tungsten compound, and the tungsten based alloy may be used. The specific gravity of the tungsten is 19.3.

The powdery material such as the tungsten or the like not chemically surface-treated by a coupling agent can be preferably used. For example, the powdery material can be preferably used in a physically treated state or in a powdered state.

If the powdery material is chemically surface-treated with the coupling agent, the powdery material may bloom or the strength of the high specific-gravity EPDM composition may deteriorate.

To make the high specific-gravity EPDM composition soft, it is preferable to add an appropriate amount of oil and the like to the EPDM as a softener.

In adding the softener to the EPDM, less than 150 wt % of the softener is added to 100 wt % of the EPDM.

The softener does not necessarily have to be added to the EPDM. But if not less than 150 wt % of the softener is added to 100 wt % of the EPDM, blooming is liable to occur in a weatherability test.

The specific gravity of the high specific-gravity EPDM composition of the present invention is set to not less than 4.5 nor more than 13.1 and preferably not less than 5.0 no more than 9.5.

If the specific gravity of the high specific-gravity EPDM composition is less than 4.5, i.e., if the specific gravity thereof is low, the volume of the dynamic damper or he like is large. Thus the dynamic damper or the like disturbs a player in using a tennis racket. On the other hand, if the specific gravity of the high specific-gravity EPDM composition is more than 13.1, it is necessary for the high specific-gravity EPDM composition to contain much powdery material, which makes it difficult to process the high specific-gravity EPDM composition.

It is preferable that the surface hardness of the vulcanized high specific-gravity EPDM composition measured by the method specified by JIS K-6253 (tester durometer type A) is less than 90.

If the hardness of the high specific-gravity EPDM composition is more than 90, it is so hard that it is difficult to mold the high specific-gravity EPDM composition integrally with a material for the viscoelastic part constituting the dynamic damper. Supposing that the high specific-gravity EPDM composition satisfies other demanded characteristics, the lower the surface hardness, the better.

It is preferable that the tensile strength of the high specific-gravity EPDM composition is not less than 3 MPa. If the tensile strength thereof is less than 3 MPa, the high specific-gravity EPDM composition is liable to crack or break in molding it into the dynamic damper or the like and when the dynamic damper or the like composed thereof is used. Supposing that the high specific-gravity EPDM composition satisfies other demanded characteristics, in the condition that it is not less than 3MPa, the higher the tensile strength, the better.

The main chain of the EPDM consists of saturated hydrocarbon and does not contain a double bond. Thus even though the EPDM is exposed to an ozone atmosphere having a high concentration or a light-irradiated environment for a long time, the main chain is not likely to cut. Thus the high specific-gravity EPDM composition has a high weatherability. In the present invention, the kind and the like of the diene component of the EPDM is not limited to a specific one.

From the viewpoint of weatherability, the less the amount of the diene, the better. EPM containing no diene is superior to the EPDM in this respect. However, since the EPM cannot be vulcanized with sulfur, it is necessary to vulcanize the EPM with peroxide. Since the speed of the vulcanization with the peroxide is lower than that of the vulcanization with the sulfur, the use of the EPM vulcanized with the peroxide causes workability to be low. Therefore the EPDM vulcanized with the sulfur is more favorable than the EPM in consideration of weatherability and workability.

As the EPDM, it is possible to use both non-oil-extended type consisting of a rubber component and oil-extended type containing the rubber component and oil. The weight of the oil of the EPDM of the oil-extended type added to the EPDM is treated as the added weight (amount of oil) of the softener.

The oil to be used as the softener is not limited to a specific one. Paraffin oil and naphthenic oil compatible with the EPDM are preferable. In addition, it is possible to use known synthetic oil such as mineral oil of aromatic series, oligomer of hydrocarbon series or process oil. As the synthetic oil, it is possible to use oligomer of alpha olefin, oligomer of butane, and amorphous oligomer of ethylene and alpha olefin.

As the vulcanizing agent, sulfur is suitable because it has a high vulcanization speed and high workability. As an accelerator, it is preferable to use 2-mercapto-benzothiazole, tetraethylthiuram disulfide, zinc dibutyl-dithiocarbamate, and tellurium diethyldithiocarbamate by appropriately combining them with each other. Thereby the rubber component can be efficiently cross-linked.

To achieve the second object, the dynamic damper of the present invention is composed of a viscoelastic part and a mass-adding part. As the mass-adding part, the high specific-gravity EPDM composition of the present invention is used.

As the mass-adding part, the high specific-gravity EPDM composition is used. Thus it is possible to make the volume of the dynamic damper of the present invention and its thickness small. It is preferable to form both the mass-adding part and the viscoelastic part in the shape of a sheet and integrate them with each other, with both parts layered on each other. The thickness of the mass-adding part is set to 0.3 mm–2.0 mm and favorably to 0.5 mm–1.0 mm. The addition of the thickness of the mass-adding part and that of the viscoelastic part is set to 3 mm–5 mm and favorably to 4 mm.

The thin sheet-shaped dynamic damper does not disturb a player during the use of a tennis racket and is unnoticeable in appearance and does not prevent from playing. Further since the dynamic damper is made of a soft material, the player is not injured thereby. Furthermore the dynamic damper is so strong that it is not broken when it strikes against an object. Moreover because the dynamic damper has high weatherability, it can be used under the blazing sun.

As the material for the viscoelastic part of the dynamic damper, it is preferable to use the EPDM which is the macromolecular material used for the mass-adding part or a macromolecular material similar to the EPDM. In the case where a rubber material similar or same to the EPDM in a vulcanizing temperature and a vulcanizing time period is used as the material for viscoelastic part, the EPDM for the mass-adding part can be bonded thereto by vulcanization in a die. That is, such a rubber material is suitable for integral molding. The material for viscoelastic part may be a foamed material. The material for viscoelastic part and the material for the mass-adding part may be bonded to each other with an adhesive agent.

From the above-described standpoint, the EPDM can be preferably used as the macromolecular material for the viscoelastic part. The EPDM can be used singly or in combination of other components.

In addition, one of the following rubbers or a combination thereof can be used for the viscoelastic part: natural rubber (NR), isoprene rubber (IR), butadiene rubber (BR), styrene-butadiene rubber (SBR), chloroprene rubber (CR), acrylonitrile-butadiene rubber (NBR), carboxylated butyl rubber, butyl rubber (IIR), halogenated butyl rubber (X-IIR), ethylene-propylene rubber (EPM), ethylene-polyvinyl acetate rubber (EVA), acrylic rubber (ACM, ANM), ethylene-acrylic rubber, chlorosulfonated polyethylene (CSM), chlorinated polyethylene (CM), epichlorohydrin rubber (CO), urethane rubber, silicone rubber, and fluorinated rubber and the like. Butyl rubber (IIR) is preferable because of the superior vibration absorption property.

As resin for the macromolecular material for the viscoelastic part, thermoplastic resin and thermosetting resin are used. The thermoplastic resin includes polyamide resin, polyester resin, urethane resin, polycarbonate resin, ABS resin, polyvinyl chloride resin, polyacetate resin, polyethylene resin, polyvinyl acetate resin, and polyimide resin. The thermosetting resin includes epoxy resin, unsaturated polyester resin, phenol resin, melamine resin, urea resin, diallyl phthalate resin, polyurethane resin, and polyimide resin. The thermoplastic resin is more favorable than the thermosetting resin in consideration of moldability and because it can be recycled. It is also possible to use thermoplastic elastomers of styrene family, olefin family, urethane family, and ester family and the like.

The dynamic damper has a horizontal frame and a vertical frame disposed at both sides of the horizontal frame. Thus the dynamic damper is lattice-shaped. The horizontal frame and the vertical frame are integral with each other or separately formed and bonded to each other. It is preferable that the horizontal frame is mounted on at least one face of a racket frame in its thickness direction and that the vertical frame is mounted on both faces of the racket frame in its widthwise direction.

It is preferable that the horizontal frame is bent in the shape of a letter "U", that one end of a bent portion of the horizontal frame disposed at both sides thereof is integral with the vertical frame or joined therewith, and that the bent portion of the horizontal frame disposed at both sides thereof is installed on both faces of the racket in its widthwise direction. It is also preferable that the number of the horizontal frames is not less than two and that the horizontal frames are mounted on the racket, with the horizontal frames sandwiching gut insertion holes therebetween.

As described above, the horizontal frame and the vertical frame are continuous and integral with each other and lattice-shaped. Therefore in the dynamic damper-installed racket, the vertical frame resonates mainly with vibrations of the racket frame in a out-of-plane direction, whereas the horizontal frame resonates mainly with vibrations of the racket frame in an in-plane direction, thus effectively suppressing vibrations in the out-of-plane direction and the in-plane direction. That is, because the horizontal frame and the vertical frame are disposed in the shape of a lattice, the dynamic damper has improved vibration-damping performance, thus reducing impacts and vibrations.

The thickness direction of the racket means the direction vertical to the gut-stretched surface. The widthwise direction of the racket means the direction parallel to the gut-stretched surface.

In the case where the dynamic damper is formed monolithically in the shape of a lattice, i.e., in the case where the vertical frame and the horizontal frame are formed integrally with each other in the shape of a lattice, the entire lattice resonates with the vibration of the racket frame in the in-plane direction, thus having an effect of suppressing the vibration in the in-plane direction.

The dynamic damper of the present invention may be formed by setting a laminate of the material for the viscoelastic part and the material for the mass-adding part in a die and bonding them to each other by vulcanization to mold them into the dynamic damper having a desired configuration. Alternatively the dynamic damper of the present invention may be formed by molding the high specific-gravity EPDM composition into a flat sheet and punching the sheet with a punching blade to shape the sheet into a desired configuration and bonding the viscoelastic part and the mass-adding part to each other with an adhesive agent.

To achieve the third object, the present invention provides a tennis racket having a dynamic damper installed on at least one portion of a head part surrounding a ball-hitting face of a racket frame or/and at least one portion of a throat part of the tennis racket.

A player can play tennis without caring about the dynamic damper mounted on the tennis racket, thus using the tennis racket with a high operability. Further the player can play tennis comfortably without being annoyed by unpleasant vibrations or injury such as tennis elbow and the like.

Supposing that the top position of the ball-hitting face surrounded with the head part of the racket frame is 12 o'clock by regarding the ball-hitting face as the surface of a clock, it is particularly preferable that the dynamic damper is installed on at least one portion of the head part in such a way that the dynamic damper is disposed in an angular range of ±15° with respect to a three o'clock position and a nine o'clock position. The three o'clock position and the nine o'clock position are maximum amplitude positions of the in-plane vibration and that of the out-of-plane secondary vibration. Thereby the dynamic damper is capable of efficiently suppressing vibrations in the in-plane and out-of-plane directions without adversely affecting the operability of the tennis racket.

Because a mass is applied to a wide portion (three o'clock position and nine o'clock position) of the head part, the moment of inertia around the grip becomes large. Thus when a ball collides with a portion of the ball-hitting face other than its center, the dynamic damper prevents the rotation of the racket and reduces the degree of burden to be applied to the player's elbow and the like.

From the viewpoint of balance, it is preferable that the dynamic damper of the present invention is installed on the racket frame at left and right positions symmetrical with respect to the widthwise center of the racket frame. But the dynamic damper-installing position is not limited to these positions. A plurality of the dynamic dampers may be mounted on the racket frame at the left and right positions thereof. It is preferable to form a concavity on the dynamic damper-installing position.

It is preferable that the racket frame is made of a fiber reinforced resin. It is particularly preferable that the racket frame is composed of fiber reinforced prepregs layered one upon another in the shape of a hollow pipe. The racket frame may be made of materials other than the fiber reinforced resin by various manufacturing methods, for example, metal and the like.

To achieve the fourth object, the present invention provides a radioactive ray shielding material composed of the high specific-gravity EPDM composition.

The radioactive ray shielding material of the present invention is composed of the high specific-gravity EPDM composition, as described above. Therefore the radioactive ray shielding material does not pollute environment and has high moldability, processability, heat resistance, and strength, and radioactive ray shielding performance. More specifically, the performance of the radioactive ray shielding material can be improved by containing the powdery material having a high specific gravity in the EPDM. Further by specifying the property of the EPDM to be mixed with the powdery material, the high specific-gravity EPDM composition is allowed to be elastic and have high moldability, processability, and durability.

Because the radioactive ray shielding material of the present invention is superior in processability, it can be cut easily with scissors and the like, and an opening can be easily formed. Thus the radioactive ray shielding material can be formed into various configurations. Further because the radioactive ray shielding material is flexible and is capable of making an elastic deformation, it can be easily inserted into a gap which requires shielding of radioactive rays in the form of a sheet or the like in conformity to the configuration of the gap. Therefore it is possible to shield radioactive rays which have leaked from a gap or the like. Further by utilizing the elastic deformation of the radioactive ray shielding material, it can be easily mounted on an irregular portion and shield the radioactive rays. Furthermore since the radioactive ray shielding material has a sufficient strength, it is not broken when it is inserted into the gap or the like and when it is processed. Thus it is possible to reliably obtain desired radioactive ray shielding performance.

The higher the specific gravity of the radioactive ray shielding material is, the higher the radioactive ray shielding performance thereof is. In this respect, it is possible to increase the specific gravity thereof by mixing the powdery material and the like such as tungsten (specific gravity: 19.3) with the EPDM at a higher mixing rate. Thus by setting the specific gravity of the radioactive ray shielding material larger than that of lead or a lead alloy (not less than 12), the radioactive ray-shielding effect provided by the radioactive ray shielding material is almost equal to or higher than that of the lead or the lead alloy.

The gamma ray absorption coefficient ($cm^{-1}$) of tungsten is about one when the energy of the gamma ray is 1.5 MeV. The gamma ray absorption coefficient ($cm^{-1}$) of lead is about 0.6 when the energy of the gamma ray is 1.5 MeV. Therefore the radioactive ray shielding material composed of the high specific-gravity EPDM composition containing tungsten powder having high radioactive ray shielding performance has high radioactive ray shielding performance in correspondence to the mixing rate of the tungsten.

More specifically, the radioactive ray shielding material of the present invention can be used by embedding it in a required portion or winding it around the required portion as a sealing material for a pipe or a wall of an atomic power plant and a panel of the atomic power plant when a repair work is performed. The radioactive ray shielding material can be also used as a guard material surrounding the periphery of an X-ray inspection machine that is used to inspect foreign matters mixed in food and inspect baggage at a customs house. The radioactive ray shielding material can be also used in the form of shop curtain having slits formed on a sheet. The radioactive ray shielding material can be also used for a syringe, gloves, protection cloths, a material covering radioactive substances, and the like.

DETAILED DESCRIPTION OF THE PREFERRED EMBODIMENTS

The embodiments of the present invention will be described below with reference to drawings.

A high specific-gravity EPDM composition of a first embodiment of the present invention contains EPDM containing at 4.0 wt % of diene and 66 wt % of ethylene. The EPDM has a Mooney viscosity 165 at 125° C.

A base material is obtained by mixing 200 wt % of the EPDM, 100 wt % of oil serving as a softener, a required wt % of powdery sulfur, a vulcanizing accelerator, carbon, zinc oxide, stearic acid, and an age resister and then kneading them by an enclosed-type kneader.

Tungsten powder whose average diameter is 9 $\mu$m and specific gravity is 19.3 is added in an amount of 400 g to 25 g of the base material without surface-treating the tungsten powder. Then the base material and the tungsten powder are kneaded by the enclosed-type kneader to obtain the high specific-gravity EPDM composition. The weight ratio of the tungsten to the high specific-gravity EPDM composition is 94.1%. The specific gravity of the high specific-gravity EPDM composition is 9.2.

The X-ray absorption characteristic of the high specific-gravity EPDM composition at 6 MeV is about 96% of that of a lead plate having a thickness equal to that of the high specific-gravity EPDM composition and about twice as large as that of a commercially available lead sheet (specific gravity: 4) having a thickness equal to that of the high specific-gravity EPDM composition. In this way, the high specific-gravity EPDM composition has radioactive ray shielding performance almost equal to that of lead or superior to that of a lead-containing sheet.

The surface hardness of the vulcanized high specific-gravity EPDM composition measured by the method specified by JIS K-6253 (tester durometer type A) is 72, and the tensile strength of the vulcanized high specific-gravity EPDM composition is 5.1 MPa.

Figure 1:
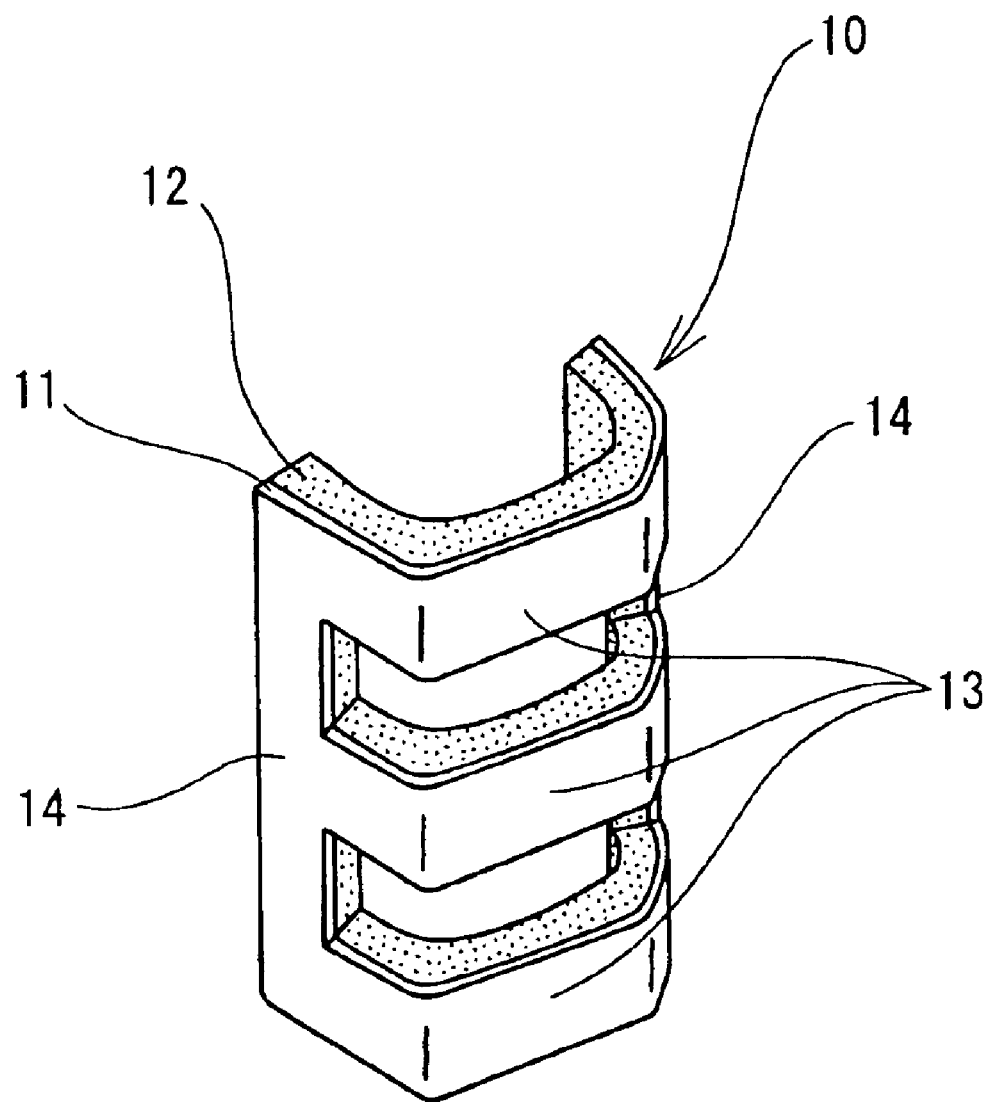
FIG. 1 is a perspective view showing a dynamic damper composed of a high specific-gravity EPDM composition of the present invention.
Figure 2A:
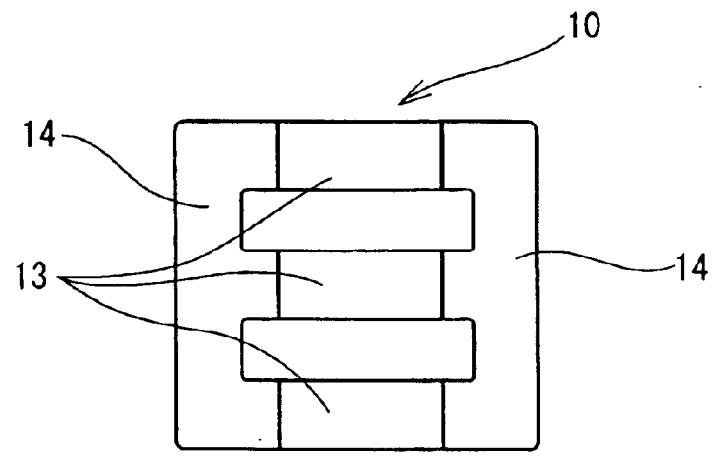
FIG. 2A is a front view showing the dynamic damper of the embodiment of the present invention.
Figure 2B:
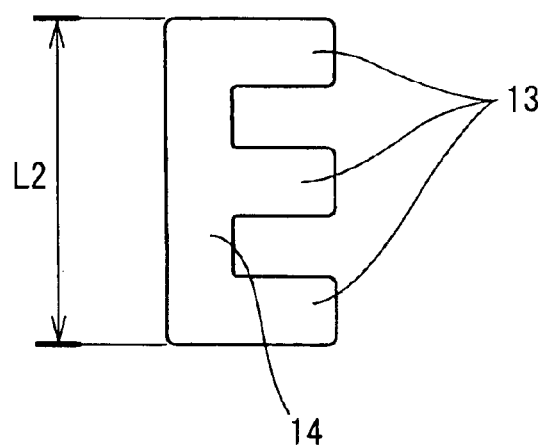
FIG. 2B is a side view showing the dynamic damper of the embodiment of the present invention.
Figure 2C:
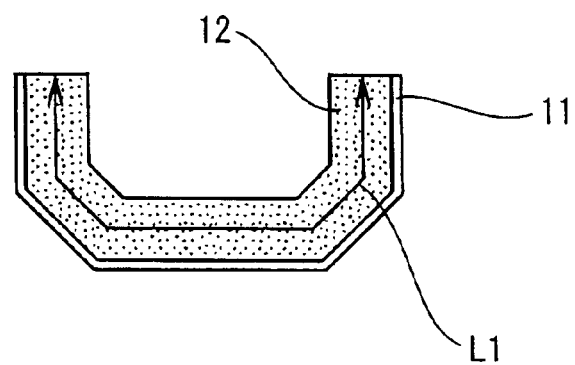
FIG. 2C is a plan view showing the dynamic damper of the embodiment of the present invention.
Figure 3:
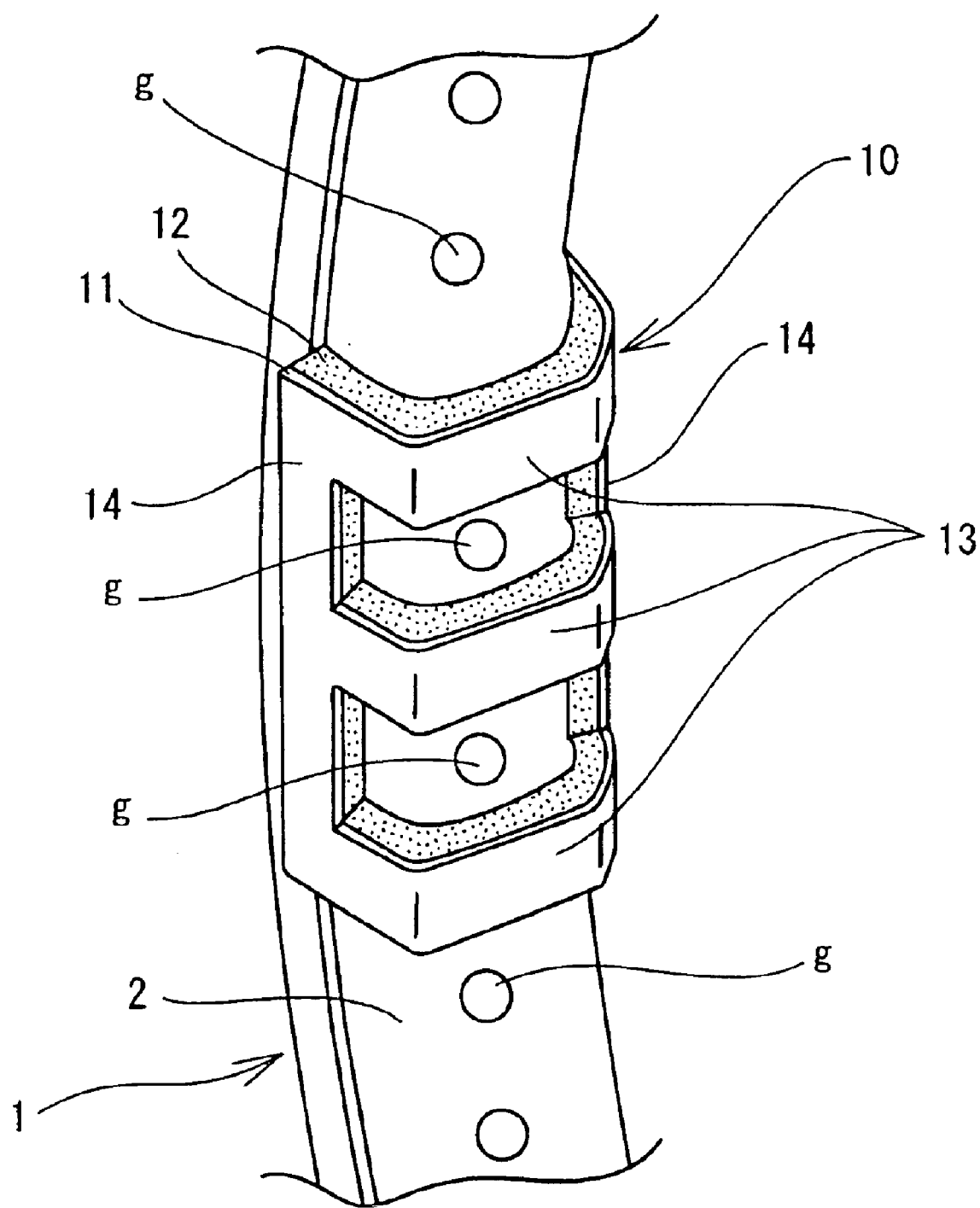
FIG. 3 is a perspective view showing a state in which the dynamic damper of the present invention has been installed on a racket frame.

FIGS. 1 through 3 show a dynamic damper 10 according to the present invention. The high specific-gravity EPDM composition is used as a mass-adding part 11 of the dynamic damper 10.

As shown in FIG. 1, the dynamic damper is composed of a sheet including the sheet-shaped mass-adding part 11 and a sheet-shaped viscoelastic part 12 layered thereon and integral therewith. Three horizontal frames 13 formed by bending the above-described sheet in the shape of "U" in section are disposed almost parallel to one another at certain intervals. Two vertical frames 14, consisting of the above-described sheet, parallel to each other are positioned at both ends of each of the horizontal frames 13. Thus the dynamic damper 10 is lattice-shaped.

The high specific-gravity EPDM composition is used for the mass-adding part 11. A rubber material containing the EPDM as its main component is used for the viscoelastic part 12.

The total of the thickness of the mass-adding part 11 and that of the viscoelastic part 12 is set to the range of 2.8 mm to 7.5 mm. In the embodiment, the total thickness of both parts 11 and 12 is 4 mm. The thickness of the mass-adding part 11 and that of the viscoelastic part 12 are 0.6 mm and 3.4 mm respectively.

As shown in FIGS. 2A, 2B, and 2C, in the dynamic damper 10, the width W1 of the U-shaped horizontal frame 13 of the dynamic damper 10 is 5 nm. The interval W2 between the adjacent horizontal frames 13 is 5.5 mm. The length L2 of the long narrow vertical frame 14 is 26 mm. The length L1 (length vertical to ball-hitting face when dynamic damper is mounted on tennis racket) of the U-shaped horizontal frame 13 is 41 mm.

Figure 4:
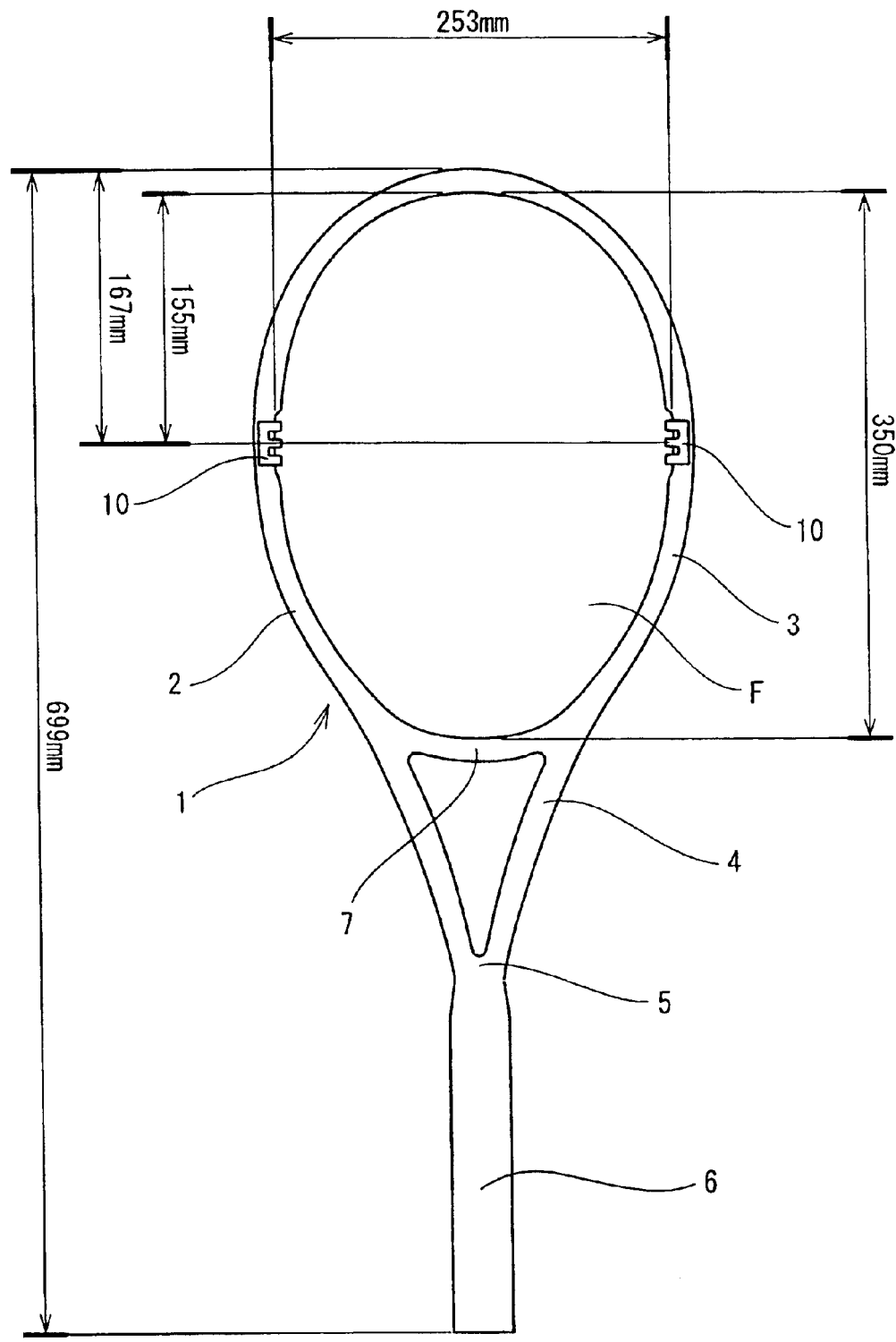
FIG. 4 is a plan view showing a tennis racket in which the dynamic damper of the present invention is installed at three and nine o'clock positions of the racket frame.

Supposing that the top position of the ball-hitting face F of the racket frame 2 is 12 o'clock by regarding the ball-hitting face F surrounded with a head part 3 as the face of a clock, as shown in FIGS. 3 and 4, the dynamic damper 10 is installed at the three and nine o'clock positions of the racket frame 2. The dynamic damper 10 is installed on the racket frame in such a way that the longitudinal direction of the vertical frame 14 of the dynamic damper 10 is disposed parallel to that of the racket frame 2.

More specifically, as shown in FIG. 3, the dynamic damper 10 is installed on the racket frame 2, with the central portion of the U-shaped horizontal frame 13 disposed on the inner surface of the racket frame 2 in its thickness direction, the bent portion of the horizontal frame 13 disposed at both sides thereof disposed on both faces of the racket frame 2 in its widthwise direction, the long and narrow vertical frame 14 disposed on both faces of the racket frame 2 in its widthwise direction, and the surface of the dynamic damper 10 at the side of the viscoelastic part 12 thereof in contact with the surface of the inner side (gut-stretched side) of the racket frame 2. The three horizontal frames 13 parallel with one another are installed on the racket frame 2, with the horizontal frames 13 sandwiching gut insertion holes g therebetween.

As shown in FIG. 4, the racket frame 2 of the tennis racket 1 is composed of the head part 3 surrounding the ball-hitting face F, a throat part 4, a shaft part 5, and a grip part 6. These parts are continuously formed. A yoke 7 separate from the head part 3 is continuous with a throat part of the racket frame 2. Thus the head part 3 and the yoke 7 surround the ball-hitting face F annularly.

The racket frame 2 is composed of a hollow pipe made of fiber reinforced resin. More specifically, the pipe is made of a laminate of fiber reinforced prepregs in which carbon fibers are impregnated with epoxy resin serving as the matrix resin.

In the embodiment, the entire length of the tennis racket 1 is set to 699 mm, as shown in FIG. 4. The thickness of the head part 3 surrounding the ball-hitting face F is set to 24 mm. The thickness of the throat part 4 is set to 21 mm. The width of the head part 3 is set to 12 mm. The width of the throat part 4 is set to 14 mm. The thickness and width of the portion of the racket frame 2 on which the dynamic damper 10 is installed are set to 21 mm and 12 mm respectively. The thickness and width of the portion of the racket frame 2 at both sides of each dynamic damper-installing portion are set to 24 mm and 14.5 mm respectively which are a little thicker than the thickness and width of the dynamic damper-installing portion respectively.

As described above, since the dynamic damper that is mounted on the tennis racket is composed of the high specific-gravity EPDM composition used as the mass-adding part, it is possible to make the volume and thickness of the dynamic damper small. Therefore a player can play tennis without caring about the presence of the dynamic damper. Further a small air resistance acts on the dynamic damper, which allows the player to have high operability in using a tennis racket. Although the dynamic damper is smaller than the conventional one, the former provides sufficient vibration-damping performance.

The dynamic damper of the present invention is manufactured in the following process:

Initially, the high specific-gravity EPDM composition is sufficiently kneaded. Thereafter, it is heated under a pressure to shape it into a sheet. Thereafter, the sheet is cut to a necessary size to obtain a mixture piece for the mass-adding part of the dynamic damper. Then the obtained mixture piece is set in a die having a desired configuration. Then a material for the viscoelastic part is filled into the die. Then the mixture for the mass-adding part and the material for the viscoelastic part are pressed and heated. As a result, both are bonded to each other by vulcanization to obtain a sheet-shaped dynamic damper composed of the mass-adding part and the viscoelastic part disposed thereon.

Instead of the above-described method, it is possible to set the material kneaded by a mill and set it into a cavity of a die for the mass-adding part. The material is shaped by press molding at a certain temperature to obtain the material for the mass-adding part. Then the material for the mass-adding part is set in the die for the dynamic damper.

In the embodiment, the dynamic damper is mounted at the three o'clock position and the nine o'clock position of the head part of the racket frame. However, the dynamic damper may be installed on at least one portion of the head part, of the racket frame, surrounding the ball-hitting face or/and at least one portion of the throat part of the racket frame.

The composition of the racket frame is fiber-reinforced resin or metal or the like, but it is not limited to them. The dynamic damper may be applied to all the kind of tennis racket.

In this embodiment, since the number of the horizontal frames is three, it has the shape of a Japanese character "日". The number of the horizontal frames may be two. In this case, the dynamic damper is rectangular. In the case where the dynamic damper has four horizontal frames, it has the shape of a Japanese character "目". So long as the dynamic damper is composed of the mass-adding part and the viscoelastic part, needless to say, its shape is not limited to a lattice.

Examples 1–7 of the high specific-gravity EPDM composition of the present invention and comparison examples 1–5 will be described in detail below.

The EPDM and other components such as additives were mixed with each other at weight percentages shown in table 1. As will be described below, different kinds of the EPDM were used in the examples and the comparison examples. The mixing amount of a softener and that of tungsten will be described later. Unit in table 1 was parts by weight.

TABLE 1

| Component | Parts by weight |
|---|---|
| EPDM | 200 |
| HAF (carbon) | 40 |
| Zinc oxide (two kinds) | 5 |
| Stearic acid | 1 |
| Age register IRGANOX 1010 | 0.5 |
| IRGANOX MD1024 | 0.5 |
| Powdery sulfur | 1 |
| Vulcanization accelerator M | 1 |
| Vulcanization accelerator TET | 0.5 |
| Vulcanization accelerator BZ | 0.5 |
| Vulcanization accelerator TTTE | 0.5 |

In the table 1, IRGANOX 1010 means pentaerythritol-tetrakis [3-(3,5-di-tert-butyl-4-hydroxyphenyl)propionate].
IRGANOX MD1024 means 2′,3-bis[[3-(3,5-di-tert-butyl-4-hydroxyphenyl)propionyl]]propionohydraxyd.
M means 2-melcapto.benzothiazole.
TET means tetraethylthiuram disulfide.
BZ means zinc dibutyl.dithiocarbamate.
TTTE means tellurium diethyldithiocarbamate.

As will be described later, oil was added to the components of each of the examples and the comparison examples as the softener by varying the kind and amount thereof. The components of each of the examples and the 15 comparison examples were kneaded by a compact enclosed-type kneader (Mixlabo SW produced by Moriyama Co., Ltd.).

An amount of 400 g of tungsten powder (SG50-W produced by Tokyo Tungsten Co., Ltd.) whose average diameter was 9 μm and specific gravity was 19.3 was added to 25 g of the base material in a powdered state, namely, without surface-treating the tungsten powder with a coupling agent. Then the base material and the tungsten powder were kneaded by the enclosed-type kneader to obtain the high specific-gravity EPDM composition. The weight ratio of the tungsten powder to the high specific-gravity EPDM composition was 94.1%.

Then the high specific-gravity EPDM composition was set in a die to press it at 170° C. for 15 minutes to obtain a sheet having a thickness of 0.5 mm.

EXAMPLE 1

As the EPDM, Esprene 670F produced by Sumitomo Chemical Co., Ltd. was used. The amount of diene was 4.0 wt %. The amount of ethylene was 66 wt %. The Mooney viscosity of the EPDM at 125° C. was 165. The Esprene 670F contained 100 wt % of oil for 100 wt % of the EPDM. The specific gravity of the high specific-gravity EPDM composition was nine.

EXAMPLE 2

As the EPDM, Esprene 512F produced by Sumitomo Chemical Co., Ltd. was used. The amount of diene was 4.0 wt %. The amount of ethylene was 65 wt %. The Mooney viscosity of the EPDM at 125° C. was 66. As a softener, 30 wt % of oil (Diana Process Oil PW380 produced by Idemitsu Kosan Co., Ltd.) was added to 100 wt % of the EPDM. The specific gravity of the high specific-gravity EPDM composition was nine.

EXAMPLE 3

As the EPDM, Esprene 601F produced by Sumitomo Chemical Co., Ltd. was used. The amount of diene was 3.5 wt %. The amount of ethylene was 59 wt %. The Mooney viscosity of the EPDM at 125° C. was 160. The Esprene 601F contained 70 wt % of oil for 100 wt % of the EPDM. The specific gravity of the high specific-gravity EPDM composition was nine.

EXAMPLE 4

As the EPDM, Esprene 673 produced by Sumitomo Chemical Co., Ltd. was used. The amount of diene was 4.5 wt %. The amount of ethylene was 64 wt %. The Mooney viscosity of the EPDM at 125° C. was 110. As a softener, 40 wt % of oil (Diana Process Oil PW380 produced by Idemitsu Kosan Co., Ltd.) was added to 100 wt % of the EPDM. The specific gravity of the high specific-gravity EPDM composition was nine.

EXAMPLE 5

As the EPDM, Esprene 533 produced by Sumitomo Chemical Co., Ltd. was used. The amount of diene was 4.5 wt %. The amount of ethylene was 58 wt %. The Mooney viscosity of the EPDM at 125° C. was 100. As a softener, 40 wt % of oil (Diana Process Oil PW380 produced by Idemitsu Kosan Co., Ltd.) was added to 100 wt % of the EPDM. The specific gravity of the high specific-gravity EPDM composition was nine.

EXAMPLE 6

As the EPDM, Esprene 512F was used similarly to the example 1. As a softener, 50 wt % of oil (Diana Process Oil PW380 produced by Idemitsu Kosan Co., Ltd.) was added to 100 wt % of the EPDM. The specific gravity of the high specific-gravity EPDM composition was nine.

Comparison Example 1

As the EPDM, Esprene 522 produced by Sumitomo Chemical Co., Ltd. was used. The amount of diene was 5.0 wt %. The amount of ethylene was 56 wt %. The Mooney viscosity of the EPDM at 125° C. was 58. Oil was not added to the EPDM. The specific gravity of the high specific-gravity EPDM composition was nine.

Comparison Example 2

As the EPDM, Esprene 582F produced by Sumitomo Chemical Co., Ltd. was used. The amount of diene was 6.0 wt %. The amount of ethylene was 71 wt %. The Mooney viscosity of the EPDM at 125° C. was 67. As a softener, 30 wt % of oil (Diana Process Oil PW380 produced by Idemitsu Kosan Co., Ltd.) was added to 100 wt % of the EPDM. The specific gravity of the high specific-gravity EPDM composition was nine.

Comparison Example 3

As the EPDM, Esprene 524 produced by Sumitomo Chemical Co., Ltd. was used. The amount of diene was 4.5 wt %. The amount of ethylene was 63 wt %. The Mooney viscosity of the EPDM at 125° C. was 25. Oil was not added to the EPDM. The specific gravity of the high specific-gravity EPDM composition was nine.

Comparison Example 4

As the EPDM, Esprene 505A produced by Sumitomo Chemical Co., Ltd. was used. The amount of diene was 9.5 wt %. The amount of ethylene was 50 wt %. The Mooney viscosity of the EPDM at 125° C. was 34. Oil was not added to the EPDM. The specific gravity of the high specific-gravity EPDM composition was nine.

EXAMPLE 7

As the EPDM, Esprene 670F produced by Sumitomo Chemical Co., Ltd. was used. The amount of diene was 4 wt %. The amount of ethylene was 66 wt %. The Mooney viscosity of the EPDM at 125° C. was 165. As a softener, 170 wt % of oil (Diana Process Oil PW380 produced by Idemitsu Kosan Co., Ltd.) was added to 100 wt % of the EPDM. The specific gravity of the high specific-gravity EPDM composition was nine.

Comparison Example 5

As tungsten-containing chloroprene commercially available, a heavy metal sheet (HMS-09C produced by Sumitomo Electric Industries, Ltd.) was used.

The hardness (standard A) of the sheet (sheet could not be formed in the comparison example 4) of the examples 1–7 and the comparison examples 1–5 was measured. The tensile strength and tensile elongation of each sheet were also measured in the tensile test. A weatherability test was also conducted to evaluate whether blooming occurred on the sheets. The test method and the evaluation method will be described later. Table 2 shown below indicates the kind of the EPDM, the kind of the EPDM, components thereof, and results of evaluations.

TABLE 2

| | E1 | E2 | E3 | E4 | E5 | E6 |
|---|---|---|---|---|---|---|
| EPDM (Esprene number) | 670F | 512F | 601F | 673 | 553 | 670F |
| Diene amount (wt %) | 4 | 4 | 3.5 | 4.5 | 4.5 | 4 |
| Ethylene amount (wt %) | 66 | 65 | 59 | 64 | 58 | 66 |
| Mooney viscosity (125° C.) | 165 | 66 | 160 | 110 | 100 | 165 |
| Oil amount (wt %) | 100 | 30 | 70 | 80 | 40 | 150 |
| Hardness (A) | 72 | 85 | 84 | 85 | 80 | 54 |
| Tensile strength (MPa) | 5.1 | 9.7 | 8.4 | 9.4 | 9.59 | 3.84 |
| Tensile elongation (%) | 590 | 195 | 681 | 170 | 190 | 609 |
| Blooming | ○ | ○ | ○ | ○ | ○ | ○ |

| | CE1 | CE2 | CE3 | CE4 | E7 | CE5 |
|---|---|---|---|---|---|---|
| EPDM (Esprene number) | 522 | 582F | 524 | 505A | 670F | — |
| Diene amount (wt %) | 5 | 6 | 4.5 | 9.5 | 4 | — |
| Ethylene amount (wt %) | 56 | 71 | 63 | 50 | 66 | — |
| Mooney viscosity (125° C.) | 58 | 67 | 25 | 34 | 165 | — |
| Oil amount (wt %) | 0 | 30 | 0 | 0 | 170 | — |
| Hardness (A) | 70 | 88 | 77 | — | 39 | 88 |
| Tensile strength (MPa) | 2.6 | 10.6 | 2.8 | — | 2.7 | 4.3 |
| Tensile elongation (%) | 350 | 200 | 320 | — | 605 | 530 |
| Blooming | X | X | ○ | X | Δ | Δ | where E denotes example, and CE denotes comparison example.

Measurement of Hardness

The surface hardness of each vulcanized high specific-gravity EPDM composition was measured by the method specified by JIS K-6253 (tester durometer type A).

Tensile Test

In JIS 3 dumbbell shape, a tensile test was conducted on the specimen sheets at a tensile speed of 500 mm/min to measure the strength and elongation thereof at the time of breakage thereof.

Weatherability Test

A weatherability test was conducted by a sunshine super-long weatherometer (WEL-SUN-HC.B type produced by Suga tester Co., Ltd.) for 120 hours to check whether each specimen sheet had blooming or not.

In the examples 1–6, the EPDM whose diene amount and ethylene amount were in the specified range was used, and the oil was used in the specified range. Therefore the surface hardness of the vulcanized specimen sheet was less than 90, and the tensile strength thereof was not less than 3 MPa. Thus the specimen sheet did not bloom and had good weatherability. It was confirmed that the specimen sheet of the examples 1–6 was optimum as the material for the mass-adding part of the dynamic damper.

In the example 7, the same EPDM as that of the examples 1 and 6 was used. However since a comparatively large amount of oil serving as the softener was used, the specimen sheet had a lower strength and had more blooming than the examples 1–6, but the extent of the blooming has no problem in the use thereof. Thus it was confirmed that the specimen sheet of the example 7 was also suitable as the material for the mass-adding part of the dynamic damper.

In the comparison example 1, since the amount of ethylene was less than 58 wt %, the strength of the specimen sheet was low. Since the amount of diene was more than 4.5 wt %, the specimen sheet had blooming and low weatherability.

In the comparison example 2, although the specimen sheet had a high strength, the diene amount was more than that of the comparison example 1. Thus the specimen sheet bloomed more than the specimen sheet of the comparison example 1 and had low weatherability.

Since the EPDM of the comparison example 3 had a low Mooney viscosity, the specimen sheet had a low strength.

Since the EPDM of the comparison example 4 had a small amount of ethylene and a low Mooney viscosity, the moldability of the specimen sheet was so low that the specimen sheet was broken into pieces and could not be processed into a sheet. In the weatherability test of a broken piece, it had blooming and had a poor weatherability.

The specimen sheet of the comparison example 5 had no problem in its hardness and strength. However, in the weatherability test, the surface thereof deteriorated and had blooming and inferior weatherability.

From the above, it can be confirmed that by using the EPDM having an optimum condition, adding an optimum amount of softener to the EPDM, and using a specified amount of tungsten powder, it is possible to form the high specific-gravity material that was appropriately soft as the material for the mass-adding part of the dynamic damper, can be processed in combination with other materials, had no problem in strength, and did not have blooming.

The example 8 in which the dynamic damper is composed of the high specific-gravity EPDM composition of the present invention and the comparison example 6 will be described in detail below.

EXAMPLE 8

As the material for the mass-adding part, the sheet prepared in the example 1 was used.

As the material for the viscoelastic part, the material composed of the components shown in table 3 was used. The components were kneaded with an enclosed-type kneader.

TABLE 3

| Component | Parts by weight |
| --- | --- |
| Esprene 532 (EPDM) (produced by Sumitomo Chemical Co., Ltd.) | 100 |
| Diana process oil Px-90 (produced by Idemitsu Kosan Co., Ltd.) | 250 |
| Zinc oxide (two kinds) | 150 |
| Stearic acid | 5 |
| Powdery sulfur | 1 |
| Vulcanization accelerator M | 1.0 |
| Vulcanization accelerator TET | 0.5 |
| Vulcanization accelerator BZ | 0.5 |
| Vulcanization accelerator TTTE | 0.5 |
| Titanium oxide | 10 |

Where M, TET, BZ, and TTTE denote the same substance as that shown in table 1 respectively.

The mass-adding part and the viscoelastic part are layered on each other and set in a die. Thereafter the laminate was pressed at 170° C. for 20 minutes and vulcanized into the shape of a dynamic damper. The shape of the dynamic damper was similar to that of the example 1.

Comparison Example 6

As the mass-adding part, a heavy metal sheet (produced by Sumitomo Electric Industries, Ltd.) having a thickness of 0.6 mm was used. The heavy metal sheet was made of tungsten-containing chloroprene rubber. The viscoelastic part was similar to that of the example 8. A dynamic damper having the same configuration as that of the example 7 was prepared by a method similar to the above-described method.

The dynamic damper of the example 8 and that of the comparison example 6 were installed at three and nine o'clock positions of the head part of the tennis racket respectively. The out-of-plane secondary natural frequency, damping ratio, in-plane tertiary natural frequency, and damping ratio of the dynamic damper-mounted tennis racket of each of the example 8 and the comparison example 6 were measured. The weatherability of each dynamic damper was evaluated by conducting an outdoor exposure test. The test method and the measuring method will be described later. Table 4 shows results of the evaluation.

TABLE 4

| | Out-of-plane secondary natural frequency (Hz) | Damping ratio (%) | In-plane tertiary natural frequency (Hz) | Damping ratio (%) | Outdoor exposure test |
| --- | --- | --- | --- | --- | --- |
| E8 | 422 | 4.5 | 371 | 5.5 | ○ |
| CE6 | 421 | 4.4 | 370 | 5.3 | △ Blooming occurred | where E denotes example, and CE denotes comparison example.

Measurement of Natural Frequency and Damping Ratio

Figure 5:
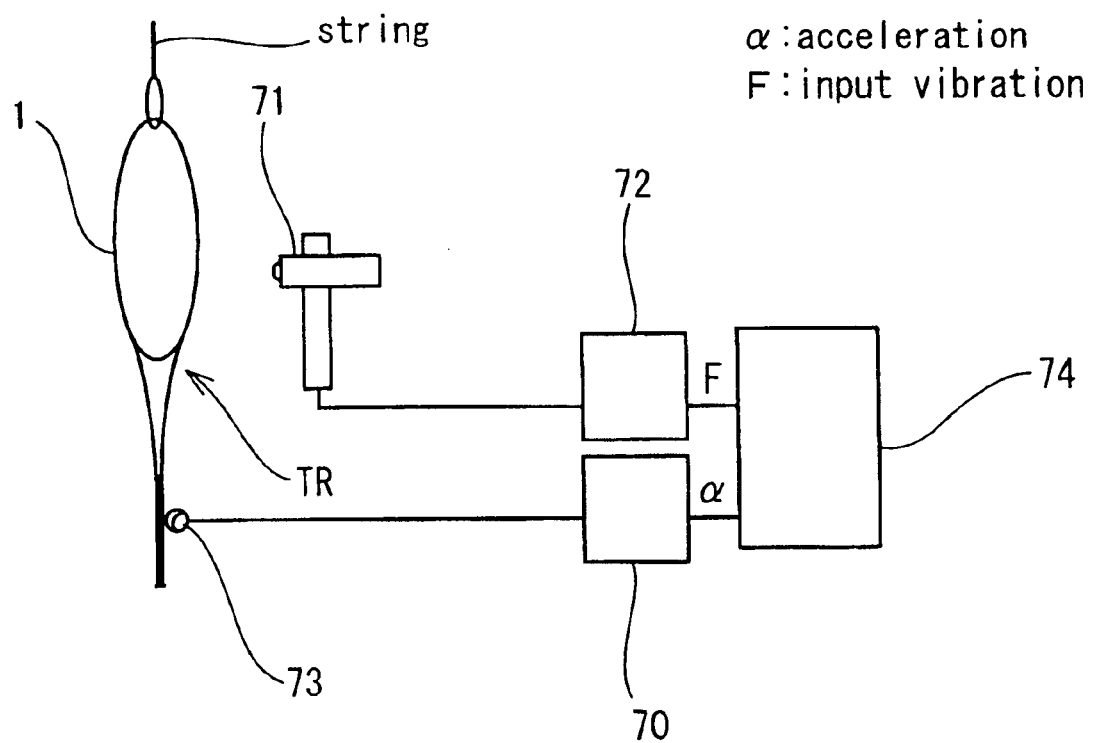
FIG. 5 is a block diagram showing a system for measuring a frequency and a damping ratio of the tennis racket.
Figure 6:
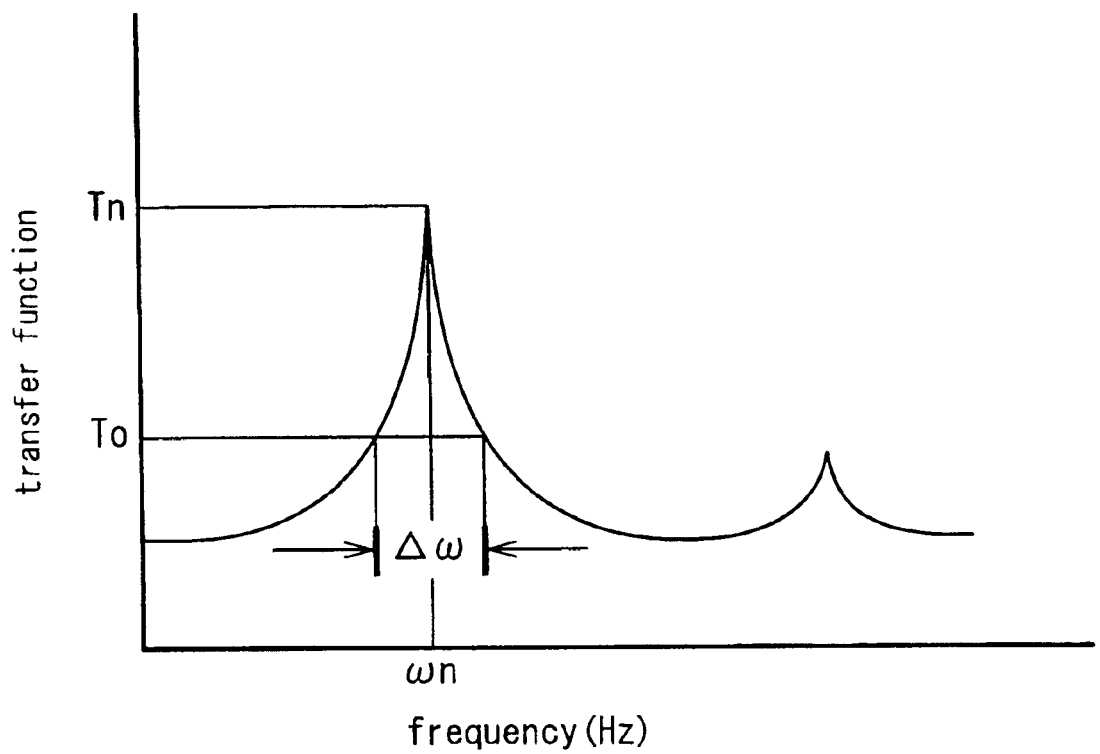
FIG. 6 is a graph showing the relationship between a frequency and a transmission function in an analysis to be made in system for measuring a frequency and a damping ratio of the tennis racket.
Figure 7:
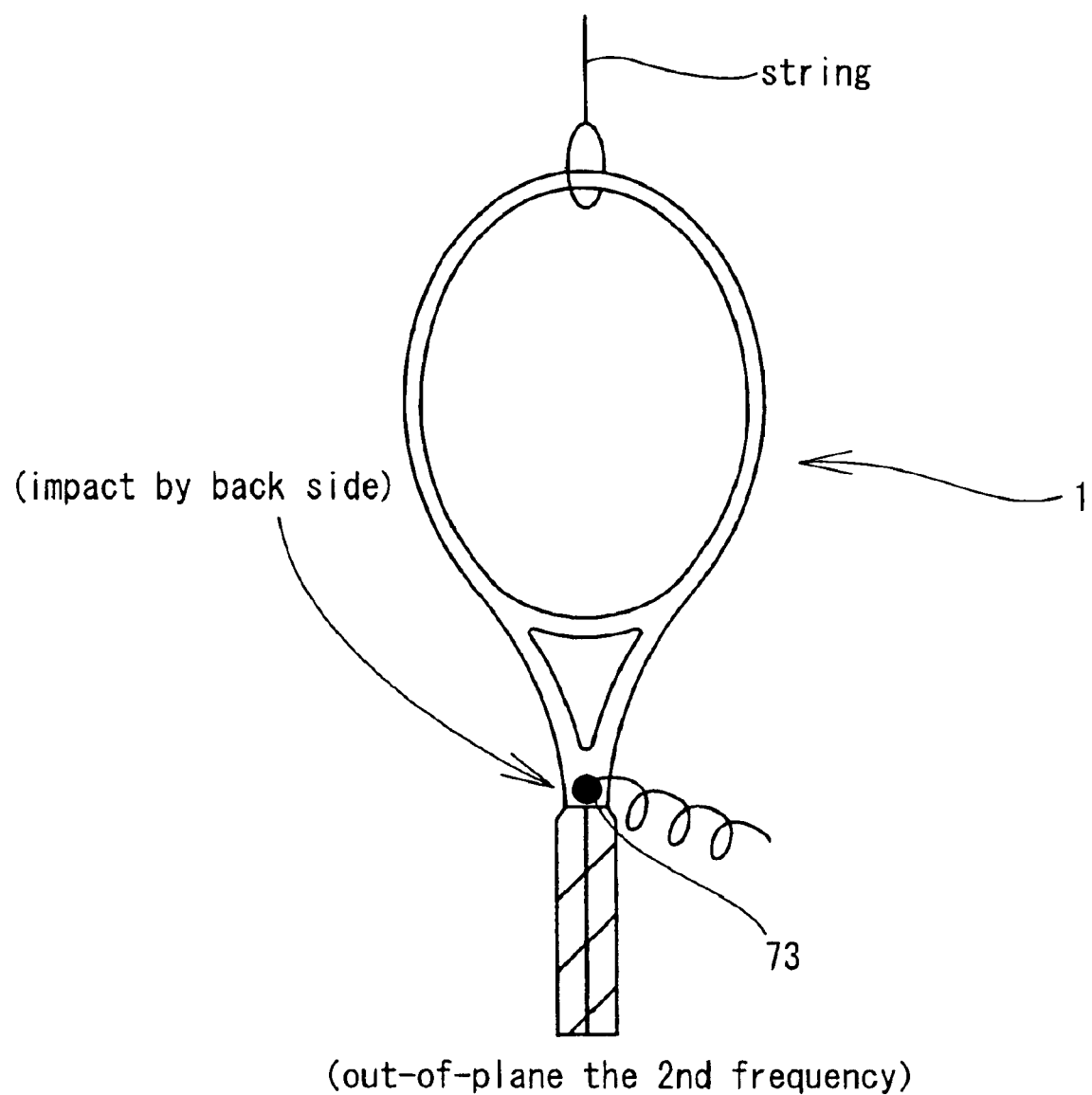
FIG. 7 is a schematic view showing a measuring position for a frequency in an out-of-plane secondary mode of the tennis racket.
Figure 8:
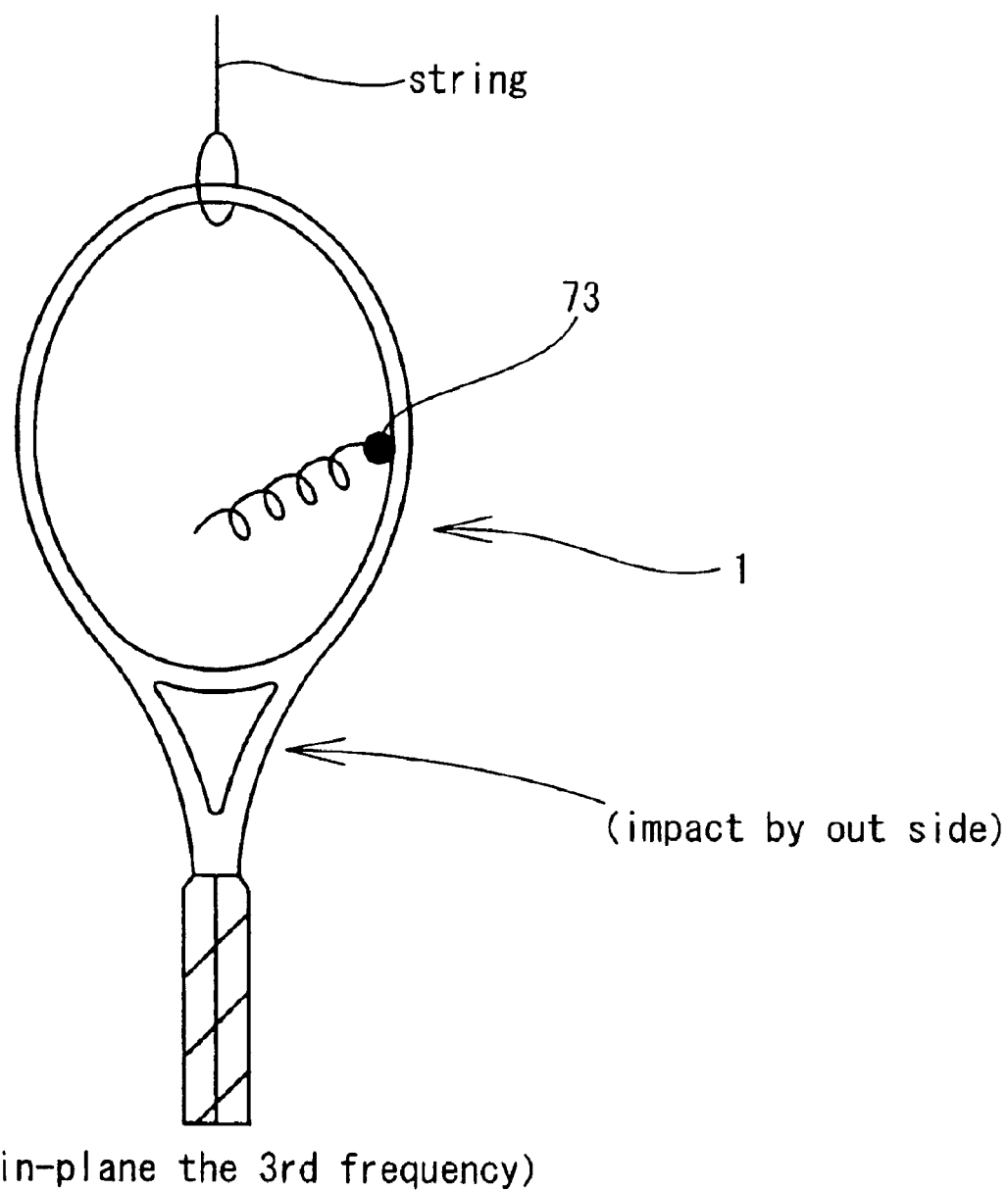
FIG. 8 is a schematic view showing a measuring position for a frequency in an in-plane tertiary mode of the tennis racket.

The method of measuring the natural frequency of each of the tennis rackets TR and the damping ratios thereof is shown in FIGS. 5 and 6. To measure them with high accuracy, an acceleration pick-up meter 73 was mounted on a maximum amplitude position of the tennis racket TR in each vibration mode. In this state, the maximum amplitude position of the tennis racket TR was hit with an impact hammer 71 to impart vibrations to the tennis racket TR. No gut was stretched on the gut-stretched part of the racket frame. As shown in FIGS. 7 and 8, the natural frequency of the tennis racket TR and its damping ratio were measured by a free supporting method of hanging the tennis racket TR with a string. An input vibration (F) measured with a force pick-up meter installed on the impact hammer 71 and a response vibration (a) measured with the acceleration pick-up meter 73 were inputted to a frequency analyzer 74 (manufactured by Furet Packard Corp., dynamic single analyzer HP 3562A) through amplifiers 72 and 70 to analyze the input vibration (F) and the response vibration (α). This method was carried out by supposing that the rigidity of the racket frame was linear. Table 4 shows the results of measurement on tennis racket of each of the examples and comparison examples.

A transmission function, in a frequency region, obtained by the analysis was determined to obtain the out-of-plane secondary frequency and the in-plane tertiary natural frequency of the racket frame. The vibration-damping ratio (ζ) was computed with reference to FIG. 6 by using the following equation:

$\zeta = (1/2) \times (\Delta\omega/\omega n)$

To=$Tn/\sqrt{2}$

Measurement of Out-of-plane Secondary Natural Frequency

Figure 9A:
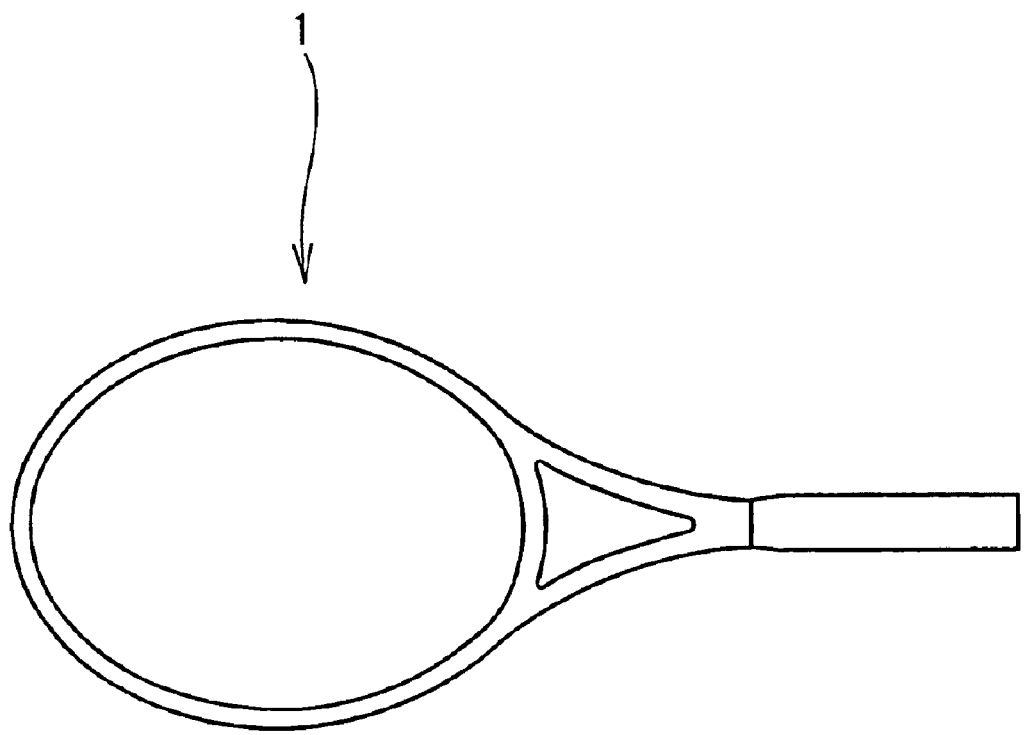
FIGS. 9A and 9B are an explanatory view respectively for explaining an out-of-plane secondary mode of the tennis racket.
Figure 9B:
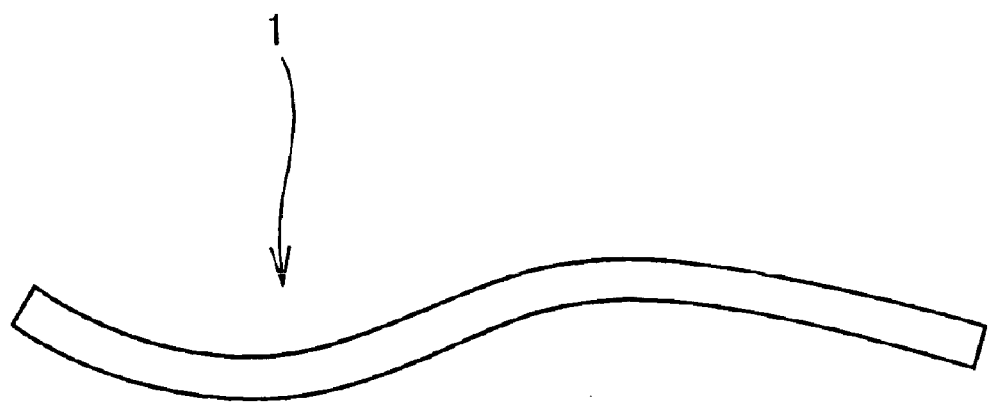

As shown in FIG. 7, the out-of-plane secondary natural frequency is a second peak which appears with respect to a low frequency when the tennis racket 1 set in a free supporting state of hanging the tennis racket 1 with a string is hit on its back. More specifically, the out-of-plane secondary frequency is a frequency at the time when the tennis racket 1 (before deformation) shown in FIG. 9A vibrates in the out-of-plane secondary mode, as shown in FIG. 9B (side view of the tennis racket).

Measurement of In-plane Tertiary Natural Frequency

Figure 10A:
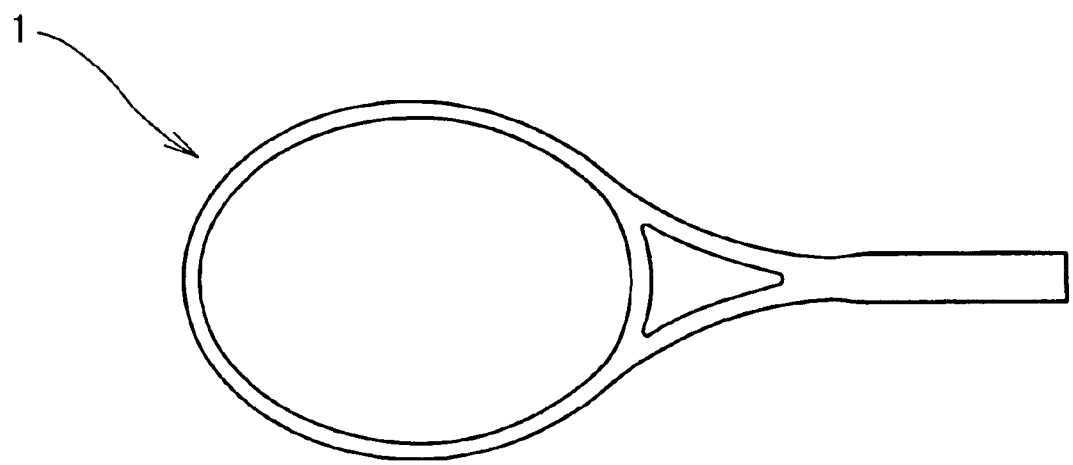
FIGS. 10A and 10B are an explanatory view respectively for explaining an in-plane tertiary mode of the tennis racket.
Figure 10B:
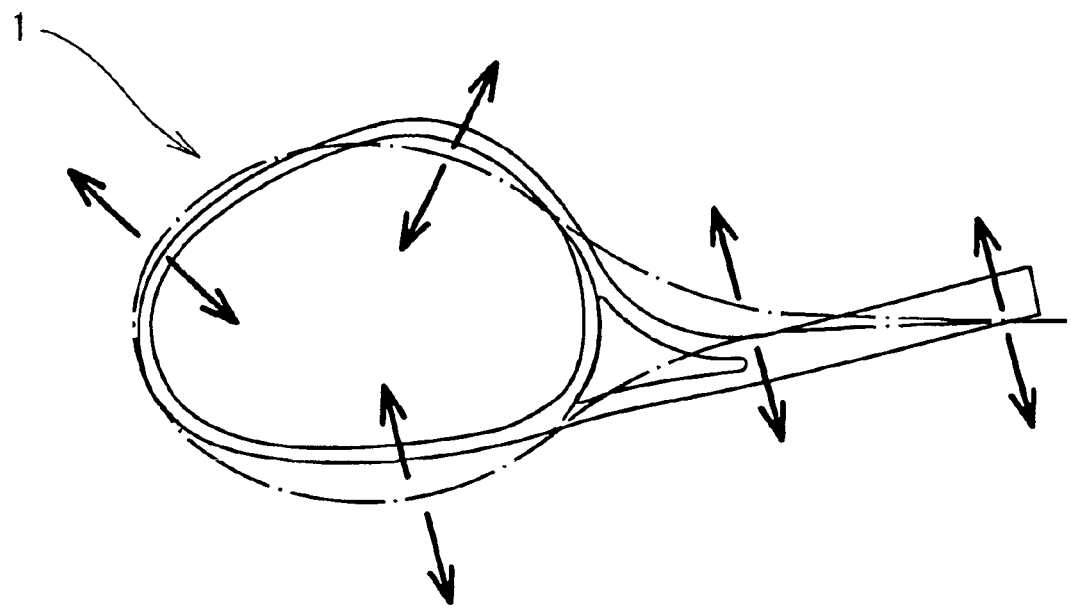

As shown in FIG. 8, the in-plane tertiary natural frequency is a third peak which appears with respect to the low frequency when the tennis racket 1 set in a free supporting state of hanging the tennis racket 1 with a string is hit from the outside. More specifically, the in-plane tertiary natural frequency is a frequency (before deformation), shown in FIG. 10A, at the time when the tennis racket 1 vibrates (deforms) in the in-plane tertiary mode, as shown in Fig. 10B.

Outdoor Exposure Test

An outdoor exposure test was conducted on the tennis racket on which the dynamic damper of the example 8 was mounted and the tennis racket on which the dynamic damper of the comparison example 6 was mounted. In the outdoor exposure test, the tennis rackets were exposed to rain, wind, and sunshine for two months of August and September. Table 4 shows the result of evaluation.

As described above, the mass-adding part of the dynamic damper of the example 8 was composed of the high specific-gravity EPDM composition, and the mass-adding part of the dynamic damper of the comparison example 6 was composed of the tungsten-containing chloroprene rubber commercially available. The vibration-damping performance of the dynamic damper of the example 8 was equal to that of the dynamic damper of the comparison example 6. As a result of exposure to the scorching heat of the sun in two months in summer, the dynamic damper of the example 8 did not have blooming and was superior in weatherability, whereas the dynamic damper of the comparison example 6 deteriorated a little on its surface. It can be confirmed that the dynamic damper composed of the high specific-gravity EPDM composition of the present invention is superior in weatherability and in vibration-damping performance.

Evaluation was made on the performance of the radioactive ray shielding material composed of the high specific-gravity EPDM composition of each of the examples 1–7. To do so, using the high specific-gravity EPDM compositions (specific gravity: nine) of the examples 1–7, sheets having a thickness of 1 mm were prepared.

As a comparison example 7, a lead plate in the same configuration as that of the examples 1–7 was used. As a comparison example 8, a lead-containing sheet (specific gravity: four) having the same configuration as that of the examples 1–7 was used.

Measurement of Radioactive Ray Shielding Performance

The radioactive ray absorption characteristics of the sheets composed of the high specific-gravity EPDM composition of the examples 1–7 respectively, the lead plate of the comparison example 7, and the lead-containing sheet of the comparison example 8 were measured by irradiating them with X-rays of 6 MeV.

The result of the measurement was that the radioactive ray shielding performance of the sheet of each of the examples 1–7 was 95% of that of the lead plate of the comparison example 7 and 1.9 times as large as that of the lead-containing sheet of the comparison example 8. It can be confirmed that the radioactive ray shielding performance of the sheet of each of the examples 1–7 is almost equal to or higher than that of the conventional lead plate or the conventional lead-containing sheet.

As apparent from the foregoing description, the present invention provides the high specific-gravity EPDM composition which is the mixture of the EPDM containing diene and ethylene at a wt % in the specified range and having a Mooney viscosity in the specified range at 125° C. and the powdery material containing powder whose specific gravity is not less than 12 as a main component thereof. The powdery material is added to the EPDM at not less than 80 wt % nor more than 97.5 wt % of the whole amount (total weight of EPDM, additives, and powdery material) of the high specific-gravity EPDM composition. Thus the high specific-gravity EPDM composition does not have blooming and has improved weatherability. Further the high specific-gravity EPDM composition is high in moldability and processability.

Further the high specific-gravity EPDM composition is soft, has a high specific gravity and strength, and does not pollute environment. Therefore the high specific-gravity EPDM composition can be used for the dynamic damper, the radioactive ray shielding material, the vibration-damping/sound insulation sheet, the soundproof material, and the like.

Further the high specific-gravity EPDM composition is appropriately soft, can be processed together with other materials, and does not have any problems in strength nor blooming. Therefore the high specific-gravity EPDM composition can be preferably used as the material for the mass-adding part that is layered on the viscoelastic part. Moreover since the high specific-gravity EPDM composition has a high specific gravity, it is possible to make the volume and thickness of the dynamic damper small. Thus the dynamic damper does not disturb a player during the use of a tennis racket and is unnoticeable in appearance. Further since the dynamic damper is soft, there is no fear that the player is injured thereby, even when the player touches the dynamic damper or strikes it against others by mistake.

Further since it is possible to form the dynamic damper as a thin sheet, a player can play tennis without caring about the dynamic damper. Furthermore since a small air resistance acts on the dynamic damper, the player has high operability in using the tennis racket. Although the dynamic damper is smaller than the conventional one, the former provides sufficient vibration-damping performance.

The radioactive ray shielding material of the present invention does not pollute environment and has high moldability, processability, heat resistance, and strength, and radioactive ray shielding performance. Thus the radioactive ray shielding material can be easily processed into various configurations and preferably used as a replacement of metal and for radiation therapy, atomic power plants, and industrial and medical radioactive ray inspection machines.

What is claimed is:

1. A high specific-gravity EPDM composition comprising:
a mixture of EPDM containing diene at less than 4.5 wt % and ethylene at not less than 58 wt % nor more than 80 wt % and having a Mooney viscosity $ML_{1+4}$ not less than 50 nor more than 170 at 125° C. and a powdery material, containing powder whose specific gravity is not less than 12 as a main component thereof, added to said EPDM at not less than 80 wt % nor more than 97.5 wt % of a whole amount of said high specific-gravity EPDM composition.

2. The high specific-gravity EPDM composition according to claim 1, wherein less than 150 wt % of a softener is added to 100 wt % of said EPDM.

3. The high specific-gravity EPDM composition according to claim 1, wherein said powdery material is tungsten, a tungsten compound or a tungsten based alloy.

4. The high specific-gravity EPDM composition according to claim 1, having a specific gravity not less than 4.5 nor more than 13.1.

5. The high specific-gravity EPDM composition according to claim 1, wherein a surface hardness of said vulcanized high specific-gravity EPDM composition measured by a method specified by JIS K-6253 (tester type A) is less than 90; and
a tensile strength of said vulcanized high specific-gravity EPDM composition is not less than 3 MPa.

6. A dynamic damper composed of a viscoelastic part and a mass-adding part, wherein a high specific-gravity EPDM composition according to claim 1 is used as said mass-adding part.

7. A tennis racket installing a dynamic damper according to claim 6 on at least one portion of a head part surrounding a ball-hitting face of a racket frame or/and at least one portion of a throat part thereof.

8. The tennis racket according to claim 7, wherein a mass-adding part is composed of said high specific-gravity EPDM composition molded in a shape of a sheet and layered on said viscoelastic part and integrated therewith.

9. The tennis racket according to claim 8, wherein a thickness of said sheet-shaped mass-adding part is set to not less than 0.3 mm nor more than 1.7 mm.

10. A radiation-shielding material comprising a high specific-gravity EPDM composition according to claim 1.

* * * * *